US009189799B2

(12) United States Patent
Dempski et al.

(10) Patent No.: US 9,189,799 B2
(45) Date of Patent: Nov. 17, 2015

(54) METHOD AND APPARATUS FOR DETERMINING AN EFFECT OF CHARACTERISTICS OF A MESSAGE ON INTERACTION WITH THE MESSAGE

(75) Inventors: Kelly L. Dempski, Redwood City, CA (US); Alexandre Naressi, Mougins (FR)

(73) Assignee: Accenture Global Services Limited, Dublin (IE)

(*) Notice: Subject to any disclaimer, the term of this patent is extended or adjusted under 35 U.S.C. 154(b) by 192 days.

(21) Appl. No.: 13/449,493

(22) Filed: Apr. 18, 2012

(65) Prior Publication Data

US 2013/0282834 A1    Oct. 24, 2013

(51) Int. Cl.
G06Q 30/02    (2012.01)

(52) U.S. Cl.
CPC .................. G06Q 30/0201 (2013.01)

(58) Field of Classification Search
CPC ................................. G06Q 30/0201
USPC .............. 709/201, 219, 206; 705/80
See application file for complete search history.

(56) References Cited

U.S. PATENT DOCUMENTS

| 7,548,930 | B2* | 6/2009 | Kobza et al. | 1/1 |
| 8,073,947 | B1* | 12/2011 | Yeh et al. | 709/224 |
| 2006/0031177 | A1* | 2/2006 | Rule | 705/80 |
| 2008/0033781 | A1* | 2/2008 | Peretti | 705/10 |
| 2008/0046511 | A1* | 2/2008 | Skrenta | 709/204 |
| 2009/0112683 | A1* | 4/2009 | Hamilton et al. | 705/10 |
| 2009/0138565 | A1* | 5/2009 | Shiff et al. | 709/206 |
| 2009/0282343 | A1* | 11/2009 | Catlin et al. | 715/738 |
| 2009/0287786 | A1* | 11/2009 | Arav | 709/206 |
| 2011/0302117 | A1* | 12/2011 | Pinckney et al. | 706/12 |
| 2013/0275859 | A1* | 10/2013 | O'Brien-Strain et al. | 715/234 |

OTHER PUBLICATIONS

European Search Report corresponding to EP 13164168, mailed Jun. 13, 2013, 7 pages.
European Communication corresponding to EP 13164168, mailed May 26, 2014, 5 pages.

* cited by examiner

*Primary Examiner* — Brian J Gillis
*Assistant Examiner* — Steve Lin
(74) *Attorney, Agent, or Firm* — Harrity & Harrity, LLP

(57) ABSTRACT

Method and apparatus are provided for determining an effect of characteristics of a first message on interaction with the first message over an electronically meditated forum. The first message may be posted to the electronically mediated forum to provide a first posted message. The first posted message includes characteristics. The electronically mediated forum may be monitored to detect at least one instance of interaction with the first posted message. Interaction data may be extracted. Interaction data may include data describing at least one interaction the first posted message. The interaction data may be analyzed to determine the effect of the characteristics of the first posted message on the interaction(s) with the first posted message to provide determined effect data.

20 Claims, 5 Drawing Sheets

METHOD AND APPARATUS FOR DETERMINING AN EFFECT OF CHARACTERISTICS OF A MESSAGE ON INTERACTION WITH THE MESSAGE

FIELD

The instant disclosure relates generally to the analysis of audience interaction with a message posted to an electronically mediated forum and, more specifically, to techniques for determining the effect of characteristics of a message on interaction with the message over an electronically mediated forum.

BACKGROUND

Electronically mediated forums are digital forums where messages may be posted, viewed, and engaged with. For example, well known electronically mediated forums include social network websites (e.g., Facebook®, MySpace®, and Twitter®), blogs, conventional websites, etc. The unifying characteristic shared by each of these different types of forums is that they all allow users to post messages that other users can interact with. As used herein, a message may include textual content and, in some instances, may be associated with media content (e.g., a sound-clip, an image, a video, etc.). For example, a message posted on Facebook® may include (i.e., be "associated with") an image, such as a photograph of the poster of the image.

Many conventional electronically mediated forums allow users to post messages on specific pages dedicated to those users (e.g., a user's individual Facebook, MySpace, or Twitter page). Other users of the forum may then view the posted message and interact with it. Users may interact with a posted message in a variety of ways. For example, merely viewing a posted message (e.g., by navigating to the page containing the posted message) may constitute interaction with that message. However, users can interact with a posted message in more intimate ways as well.

For example, users can interact with a posted message by posting a comment in response to the originally posted message, indicating that they "like" the originally posted message, denoting themselves as a "fan" of the entity responsible for the posted message, sharing the posted message and/or address of the page containing the posted message with other users, re-tweeting a posted message, etc. Additionally, where the originally posted message includes, for example, a link to another webpage where a user can purchase a product/service described in the posted message, a user may interact with the posted message by clicking on the link.

Increasingly, entities are recognizing electronically mediated forums as valuable channels for both advertising and market research. For example, many companies now have their own Facebook page. Companies often use their Facebook pages to post messages announcing the release of new products and services. These message are essentially "microcampaigns" meant to engage a target audience in various ways and, in some cases, incite them to action (e.g., motivate the target audience to purchase the product and/or services described in the posted message, recommend such products/services to others by forwarding information, etc.). Other entities besides corporations have been utilizing electronically mediated forums in similar ways. For example, many rock bands now have their own electronically mediated forum page wherein they can post messages in order to engage with their fans, announce concert dates and album release dates, etc.

Despite the heightened awareness regarding the value of electronically mediated forums as a means of reaching a target audience, little has been done in the way of determining how message characteristics (i.e., characteristics of a posted message) effect audience interaction with that message. That is to say, conventional tools for analyzing audience interaction with a message posted to an electronically mediated forum have proven themselves incapable of determining what about a given message (i.e., what characteristics of a message) prompts certain interactions with the message. Accordingly, it is desirable to provide techniques for determining the effect of characteristics of a message on interaction with the message over an electronically mediated forum.

SUMMARY

The instant disclosure describes methods and apparatuses for determining an effect of characteristics of a message on interaction with the message over an electronically mediated forum. To this end, in one example, a method for determining an effect of characteristics of a first message on interaction with the first message over an electronically mediated forum is provided. The method includes posting, by a processing device, the first message to the electronically mediated forum to provide a first posted message. The first posted message includes characteristics. The processing device may further monitor the electronically meditated forum to detect at least one instance of interaction with the first posted message. Continuing, the processing device may extract interaction data, which may include data describing the at least one interaction with the first posted message. Finally, the method includes analyzing, by the processing device, the interaction data to determine the effect of the characteristics of the first posted message on the at least on interaction with the first posted message to provide determined effect data.

In one example, the method also includes modifying, by the processing device, the first posted message by modifying at least one characteristic of the first posted message. The first posted message could be modified, for example, based on the determined effect data. In another example, the method further includes generating, by the processing device, a second message having second characteristics (i.e., at least one characteristic that is different from any of the characteristics of the first posted message). In this example, the second message may be based on the determined effect data. This example may also include the step of posting, by the processing device, the second message to the electronically mediated forum (i.e., the same electronically mediated forum that the first message was posted to) or a different electronically mediated forum to provide a second posted message.

In one embodiment of the instant disclosure, the characteristics (i.e., the characteristics of either the first or second posted messages) may include at least one of attributes, tactics, and/or themes. In one example, the attributes include at least one of the following: (i) time attributes describing when the posted message was posted to the electronically mediated forum; (ii) where a media file is associated with the posted message, type attributes describing which type of media is associated with the posted message; and/or (iii) electronically mediated forum attributes describing which electronically mediated forum of a plurality of electronically mediated forums the posted message was posted to.

In another example, the tactics include at least one of the following: (i) information describing whether the posted message was phrased as a question; (ii) information describing whether the posted message was posted to the electronically mediated forum prior to a release of a product or service associated with the posted message; (iii) information describing whether the posted message requested an opinion as a form of interaction with the posted message; and/or (iv) information describing whether the posted message requested a reaction as a form of interaction with the posted message.

In still another example, themes include information describing a generic category of the posted message. For example, a theme might indicate that a given posted message relates to generic categories such as art, music, sports, news, finance/business, law, etc. Of course, the foregoing list is not exhaustive and it is recognized that any number of generic categories may be described by themes in accordance with the teachings of the present disclosure.

An apparatus and computer readable media for carrying out the foregoing method are also disclosed.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Figure 1:
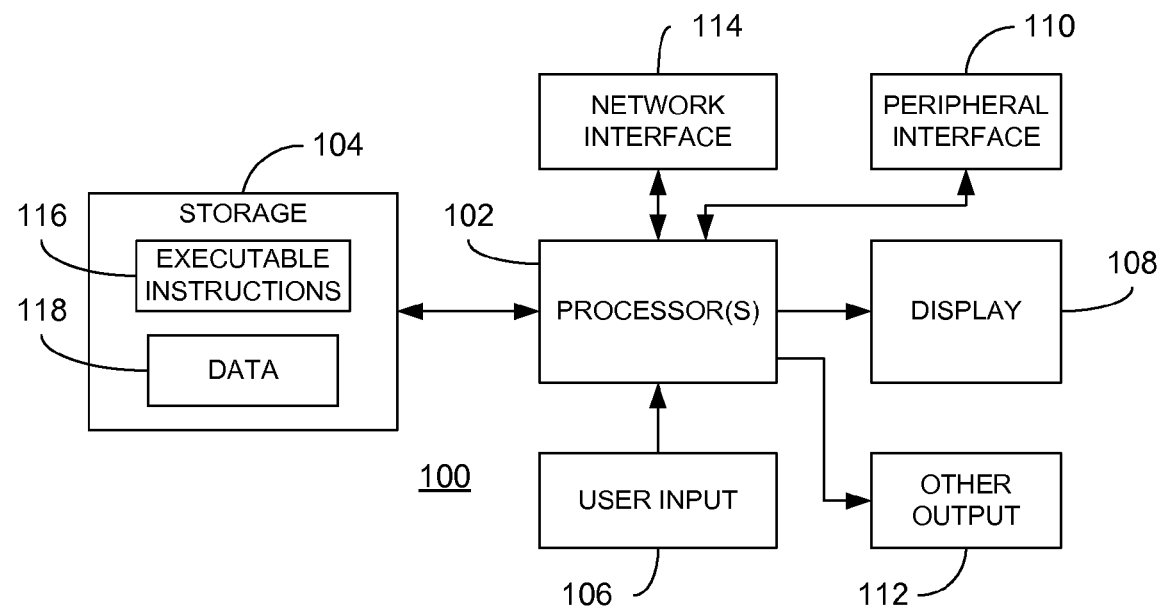
FIG. 1 is a block diagram illustrating one example of a computing device for determining an effect of characteristics of a message on interaction with the message over an electronically mediated forum in accordance with the instant disclosure.

Referring now to FIG. 1, one example of a computing device 100 for determining an effect of characteristics of a message on interaction with the message over an electronically mediated forum is illustrated. The device 100 includes a processor 102 coupled to a storage component 104. The storage component 104, in turn, includes stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage component 104 may comprise one or more devices such as volatile or nonvolatile memory including, but not limited to, random access memory (RAM) or read only memory (ROM). Further still, the storage component 104 may be embodied in a variety of forms, such as a hard drive, optical disc drive, floppy disc drive, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may include one or more user input devices 106, a display 108, a peripheral interface 110, other output devices 112 and a network interface 114 in communication with the processor 102. The user input device 106 may comprise any mechanism for providing user input to the processor 102. For example, the user input device 106 may comprise a keyboard, a mouse, a touch screen, microphone and suitable voice recognition application, or any other means whereby a user of the device 100 may provide input data to the processor 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art.

The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single computing device 100 is illustrated in FIG. 1, it is understood that a combination of such computing devices may be configured to operate in conjunction (for example, using known networking techniques) to implement the teachings of the instant disclosure.

Figure 2:
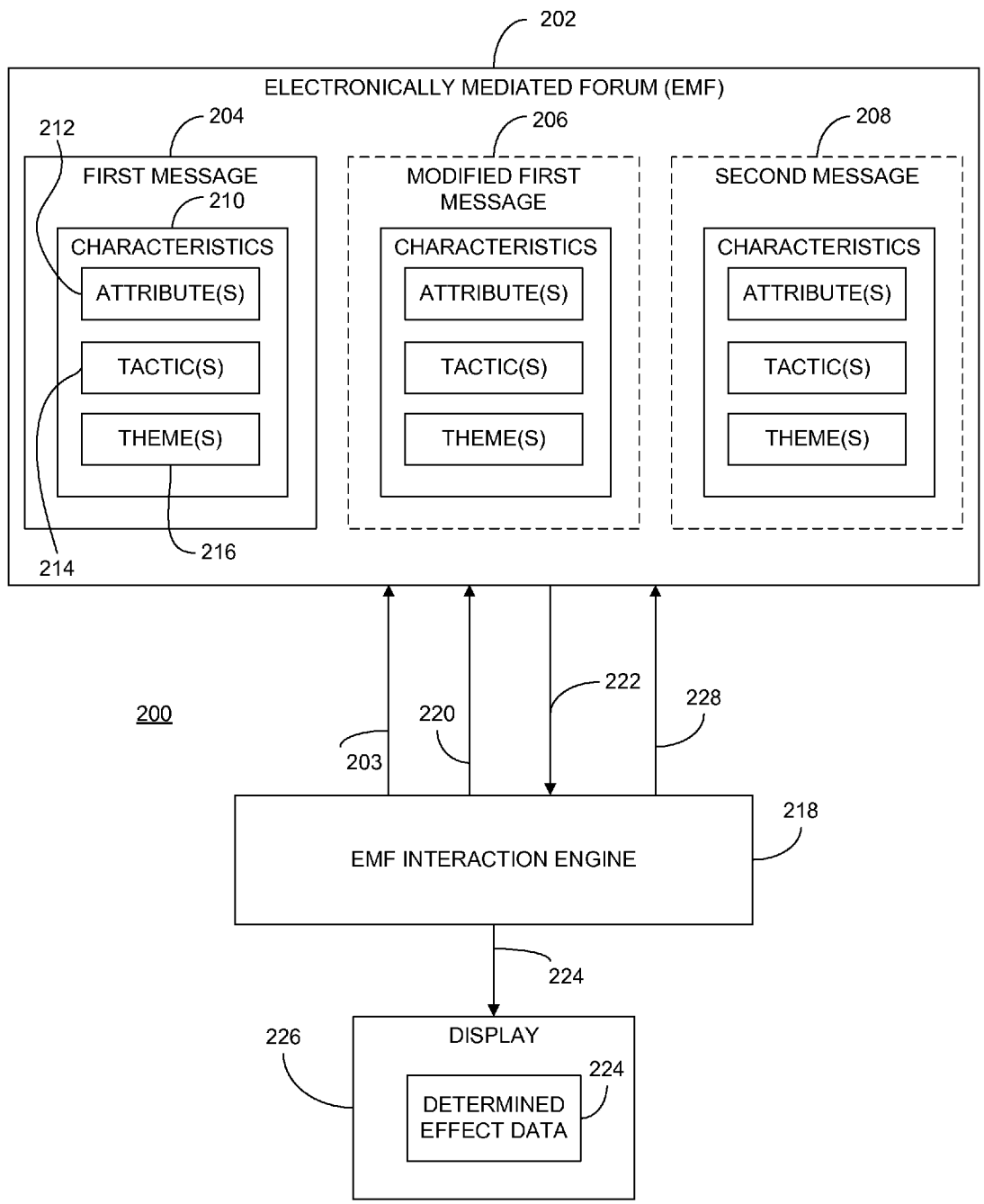
FIG. 2 is a block diagram illustrating one example of a system for determining an effect of characteristics of a message on interaction with the message over an electronically mediated forum in accordance with the instant disclosure.

FIG. 2 is a block diagram illustrating one example of a system 200 for determining an effect of characteristics of a message on interaction with the message over an electronically mediated forum in accordance with the instant disclosure. The system 200 includes an electronically mediated forum (EMF) interaction engine 218 in communication with an electronically mediated forum 202. In practice, the functionality of the EMF interaction engine 218 may be implemented, for example, using the computing device 100 of FIG.

1. However, those having ordinary skill in the art will appreciate that the EMF interaction engine 218 may be implemented using any suitable combination of hardware and/or software as known in the art. Furthermore, the EMF interaction engine 218 may be implemented by networked computing devices, such as server computers or the like, wherein each computing device implements a portion of the functionality of the EMF interaction engine 218.

The EMF interaction engine 218 may communicate with the electronically mediated forum 202 over any suitable public or private communication network (not shown) such as the Internet, or proprietary networks such as enterprise local area or wide area networks, respectively. In line with the teachings of the present disclosure, the electronically mediated forum may be implemented via one or more servers, as discussed in further detail with reference to FIG. 3 below. The server(s) may make the electronically mediated forum accessible over any of the communication networks discussed above. As noted above, and by way of example and not limitation, an electronically mediated forum could include social network websites (e.g., Facebook®, MySpace®, Twitter®, Linkedin®), blogs, conventional websites, etc.

In operation, the EMF interaction engine 218 is operative to post a first message 203 to the electronically mediated forum 202 to provide a first posted message 204. In one example, the EMF interaction engine 218 is operative to post the first message 203 to the electronically mediated forum 202 in response to user input (e.g., entered via user input 106). In another example, the EMF interaction engine 218 is operative to automatically post the first message 203 to the electronically mediated forum 202 based upon predefined rules (e.g., rules stored as data 118 in storage 104). Techniques for posting a message to an electronically mediated forum are well known to those having ordinary skill in the art. Upon posting the first message 203 to the electronically mediated forum 202, the EMF interaction engine 218 may also generate and store (e.g., in storage 104, where the EMF interaction engine 218 is implemented as a computing device, such as computing device 100) posted message identification data (not shown). The posted message identification data includes all of the data necessary for the EMF interaction engine 218 to locate a posted message (e.g., the first posted message 204 and/or a second posted message 208) on the electronically mediated forum 202. For example, the posted message identification data may include the URL address of the specific page within the electronically mediated forum 202 that contains the posted message. In another example, the electronically mediated forum 202 may return a "posting ID" (not shown) that the EMF interaction engine 218 may use to track a posted message. However, other suitable identification information that may be used to locate a posted message (e.g., the time of day that the message under consideration was posted) may also be included as part of the posted message identification data or posting ID.

The first posted message 204 includes characteristics 210. Characteristics 210 describe features of a message (e.g., the first posted message 204, the modified first posted message 206, and/or the second posted message 208) such as the content of the message, the purpose of the message, the meaning of the message, information regarding the date and time that the message was posted, etc. Broadly speaking, characteristics 210 may include attribute(s) 212, tactic(s) 214, and/or theme(s) 216 relating to a message. Attribute(s) 212 describe one or more technical features of a message, such as the first posted message 204. By way of non-limiting example, attribute(s) may include (i) time attributes describing when a message was posted to the electronically mediated forum 202 (e.g., the date and time that a message was posted); (ii) type attributes describing which type of media, if any, is associated with a posted message (e.g., whether a video, image, or sound clip was included as part of a posted message); and/or (iii) electronically mediated forum attributes describing which electronically mediated forum of a plurality of electronically mediated forums a given message was posted to (e.g., information describing whether the message under consideration was posted to Facebook®, Twitter®, MySpace®, Linkedin®, Amazon.com™, a particular blog, etc.).

Tactic(s) 214 describe one or more strategic features of a message, such as the first posted message 204. By way of non-limiting example, tactic(s) may include: (i) information describing whether a posted message was phrased as a question (i.e., information describing whether the text of a message was an inquiry, such as, "How many times have you seen this movie?"); (ii) information describing whether a posted message was posted to an electronically mediated forum prior to the release of a product or service associated with the posted message (i.e., information describing whether the message was posted prior to the release of a product service associated with the message, such as, whether the message was posted before the release date of a movie that the message was concerned with); (iii) information describing whether a posted message requested an opinion as a form of interaction with the posted message (e.g., information describing whether the audience for the message was prompted to opine on the subject matter of the message, such as, "Do you like this movie trailer?"); and/or (iv) information describing whether a posted message requested a reaction as a form of interaction with the posted message (e.g., whether the posted message requested the audience to take an affirmative action in response to the message, such as, "If you like this movie trailer, please send a link to this page to a friend").

Theme(s) 216 describe one or more general topics that a message is concerned with. That is to say, theme(s) include information describing a generic category of a posted message. By way of non-limiting example, a given message could include theme(s) indicating that the message concerned a generic category such as art, music, sports, news, finance/business, law, etc. For instance, a given message might include text stating "What is your favorite instrument?" In this case, the theme of the message could be identified as "music." Of course, the theme could also be identified as "instruments." Thus, themes can assume any suitable level of detail as desired, but broadly refer to a general topic that a message is concerned with.

Returning to the operation of system 200 shown in FIG. 2, the EMF interaction engine 218 is further operative to monitor the electronically mediated forum 202 to detect at least one instance of interaction with a posted message, such as the first posted message 204. Generally, the manner in which interactions are detected is at least partially dependent upon the type of interaction. In one example, the EMF interaction engine 218 may be implemented, at least in part, as a computer program such as a bot (e.g., a web crawler) capable of scanning the content of the page in the electronically mediated forum 202 containing the posted message under consideration (e.g., the first posted message 204) in order to detect one or more instances of interaction, such as responsive comments posted by others, with the posted message. In another example, the electronically mediated forum 202 may provide an application programming interface (API) allowing the EMF interaction engine 218 to directly query the electronically mediated forum 202 in order to detect one or more instances of interaction with a posted message, where such interactions take the form of selection of a "like" user input mechanism as known in the art. Alternatively, the EMF interaction engine 218 may be implemented using any other suitable data monitoring techniques known in the art.

There are a variety of ways in which to interact with a posted message. For example, the EMF interaction engine 218 may detect an instance of interaction when the posted message is clicked (e.g., a viewer clicks on the posted message with their mouse cursor). In another example, an instance of interaction may be detected when a comment is posted in response to a posted message. In other examples, an instance of interaction may be detected when a viewer of the posted message indicates that they "like" the posted message (e.g., by pressing a "like" button on Facebook®), when a viewer of the posted message denotes themselves as a "fan" of the posted message or the entity responsible for posting the posted message, when a viewer of the posted message shares the posted message and/or address of the page containing the posted message with someone else (e.g., another user of the electronically mediated forum 202), etc. These different types of interactions with a posted message may be detected by the EMF interaction engine 218 using any suitable detection technique, such as the detection techniques discussed above (e.g., via a bot or API).

Additionally, where the posted message (e.g., the first posted message 204) includes, for example, a link to another webpage where a user can purchase a product/service described in the posted message, a viewer may interact with the posted message by clicking on the link. In one example, this type of viewer interaction may be detected by instrumenting the link in the posted message along with the landing page (i.e., the webpage that the link directs a viewer to). This type of instrumentation may be accomplished using suitable link/landing page instrumentation techniques known in the art. Any of the foregoing, non-limiting examples constitute ways in which a viewer can interact with a posted message.

The EMF interaction engine 218 is further operative to extract interaction data 222 describing each instance of interaction with a posted message (e.g., the first posted message 204). For example, when a viewer comments on a posted message, the page containing the posted message may be updated to include the text/image/video/audio/etc. forming the content of the comment, the time of day that the comment was posted, the identity of the commenter, an image (e.g., an avatar) associated with the commenter, etc. This type of information is referred to herein as interaction data 222 (i.e., data characterizing an interaction with a posted message). Interaction data 222 may take a variety of forms. For example, interaction data 222 is not limited to information that is readily available on the page of the electronically mediated forum 202 containing the posted message (e.g., the content of each comment, the total number of comments, the total number of "likes," the total number of "shares," etc.), but may also include deep-seated information describing, for example, demographic information about the viewer(s) of the posted message to the extent that such information is available.

For example, in many instances the EMF interaction engine 218 may extract interaction data 222 comprising data describing the identity of the viewer(s). This is especially true where a viewer has a "public profile" (e.g., on Facebook) or has signed up for a service such as "Facebook Connect." As known in the art, when a viewer has a "public profile," any other user of the electronically mediated forum 202 may view that user's profile to glean information about the user. Similarly, Facebook Connect is a platform that allows users to "connect" their Facebook identity, friends, and privacy information with third party platforms. That is, when a user utilizes a platform such as Facebook Connect (or any other suitable information sharing platform known in the art), authorized third parties may gain access to detailed information about that user. In these types of instances, the EMF interaction engine 218 may extract interaction data 222 such as data indicating the name, age, gender, location, education, income, profession, etc. for any viewer who has viewed the posted message. The foregoing types of interaction data 222 are exemplary in nature and are not intended to limit any additional types of data that may be useful in furthering the described functionality of the EMF engine 218.

The EMF interaction engine 218 is operative to analyze the interaction data 222 in order to determine the effect of the characteristics 210 of a posted message (e.g., the first posted message 204) on any interactions with the posted message in order to provide determined effect data 224. As used herein, the determined effect data may include any information that describes a relationship between characteristics of a message and audience interaction with that message. For example, the determined effect data 224 may include data indicating that use of a video clip in a message leads to an increase in the number of users who "like" the message. Nevertheless, the EMF interaction engine 218 is operative to analyze the interaction data 222 in a variety of ways. In one example, the EMF engine 218 is operative to analyze the interaction data 222 by aggregating, for example, the total number of views/comments/likes/shares/etc. for a given posted message (e.g., where that information is not directly available from the interaction data 222). In another example, the EMF engine 218 is operative to analyze the interaction data 222 by assessing, for example, the overall sentiment concerning a posted message, the relevance of comments posted in response to a posted message, the occurrence of certain keywords or topics in comments posted in response to a posted message, and/or any tracked behavior of a user (e.g., assessing whether users click on a hyperlink pointing to a particular website where a product can be purchased). In still another example, the EMF interaction engine 218 is operative to analyze the interaction data 222 by generalizing (e.g., averaging) demographic information about the viewers of the posted message. For example, the EMF interaction engine 218 may analyze the interaction data 222 by determining that fifty-percent of the viewers were female, that the average age for a viewer was twenty-five years old, that the average viewer had an undergraduate college education, that the average income of a viewer was $35,000/year, that sixty percent of the viewers were located in the western time zone, etc.

Furthermore, as part of the analysis process, the EMF interaction engine 218 may correlate characteristics 210 of the posted message under consideration with the interaction data 222 to ascertain how particular characteristics 210 (e.g., particular attribute(s) 212, tactic(s) 214, and/or theme(s) 216) influence viewer's interaction with the posted message. For example, the EMF engine may utilize data correlation techniques known in the art in order to draw conclusions about how certain characteristics 210 of a given posted message effect viewer's interaction with that message. For instance, the EMF interaction engine 218 may determine that messages that include video clips generate more "likes" than messages that do not include video clips (or alternatively, messages that include images, for example, but not video clips). In this manner, the EMF interaction engine 218 may illuminate how a message's composition (i.e., characteristics 210) influence viewers' interaction with the message. In one example, the EMF interaction engine 218 is operative to detect patterns regarding message composition using pattern recognition techniques known in the art. Furthermore, the EMF interaction engine 218 may be used to test how message characteristics effect interaction with messages (e.g., by posting messages having varying attributes, tactics, and/or themes). In one example, machine learning techniques known in the art may be employed to "teach" the EMF interaction engine using historical data so as to optimize the posting of a new message in order to achieve a desired end. Following the generation of the determined effect data 224, in some embodiments, the determined effect data 224 may be translated to display data using techniques known in the art and presented on a display, such as display 226. The display 226 may comprise any of the display types referenced above with regard to display 108, or any other suitable types of displays known in the art.

In one embodiment, after the EMF interaction engine 218 has posted the first message 204 to the electronically mediated forum 202, the EMF interaction engine 218 is operative to modify the first posted message by modifying at least one characteristic 210 of the first posted message 204. As used herein, modifying the first posted message 204 may include (i) changing at least one characteristic 210 of the first posted message 204 (e.g., changing the theme 216 of the first posted message 204), without actually posting a new message, to provide the modified first posted message 206 or (ii) posting a new message (i.e., a message that shares at least one characteristic 210 with the first posted message 204) to provide the modified first posted message 206. In one example, the modification to the first posted message 204 is based on the determined effect data 224.

In addition to, or alternatively to, modifying the first posted message 204, the EMF interaction engine 218 may also generate a second message 228 having second characteristics (i.e., at least one characteristic that is different from the characteristics of the first posted message 204) and post the second message 228 to the electronically mediated forum 202 (or a different electronically mediated forum) to provide a second posted message 208. The second posted message 208 may be based on the determined effect data 224. For example, after analysis of the interaction data 222 describing viewers interaction with the first posted message 204, it may become apparent that the characteristics of the first posted message 204 are not stimulating a desired audience interaction.

Accordingly, the EMF interaction engine 218 may generate a second message 228 having second (i.e., different) characteristics based on the determined effect data 224 in order to stimulate a desired audience interaction. For example, analysis of the interaction data 222 related to the first posted message 204 may indicate that very few audience members have "liked" the first posted message 204, where maximizing the number of audience "likes" is the goal of the posted message 204. As such, goal information describing the desired outcome of a particular message may be input into the EMF interaction engine 218 so that the EMF interaction engine 218 may analyze the goal and alter the characteristics of a posted message (or post a new message with new characteristics) based on the goal information. Accordingly, the EMF interaction engine 218 may generate and post a second message 228 that has different characteristics 210 than the first posted message 204 in order to increase the number of audience "likes." For example, the EMF interaction engine 218 may generate a second message 228 that includes a video clip (assuming the first posted message did not include a video clip), if the determined effect data 224 (and/or any other historical data correlating posted message characteristics 210 with audience interactions) indicates that associating a posted message with a video clip typically yields a high number of audience "likes."

Figure 3:
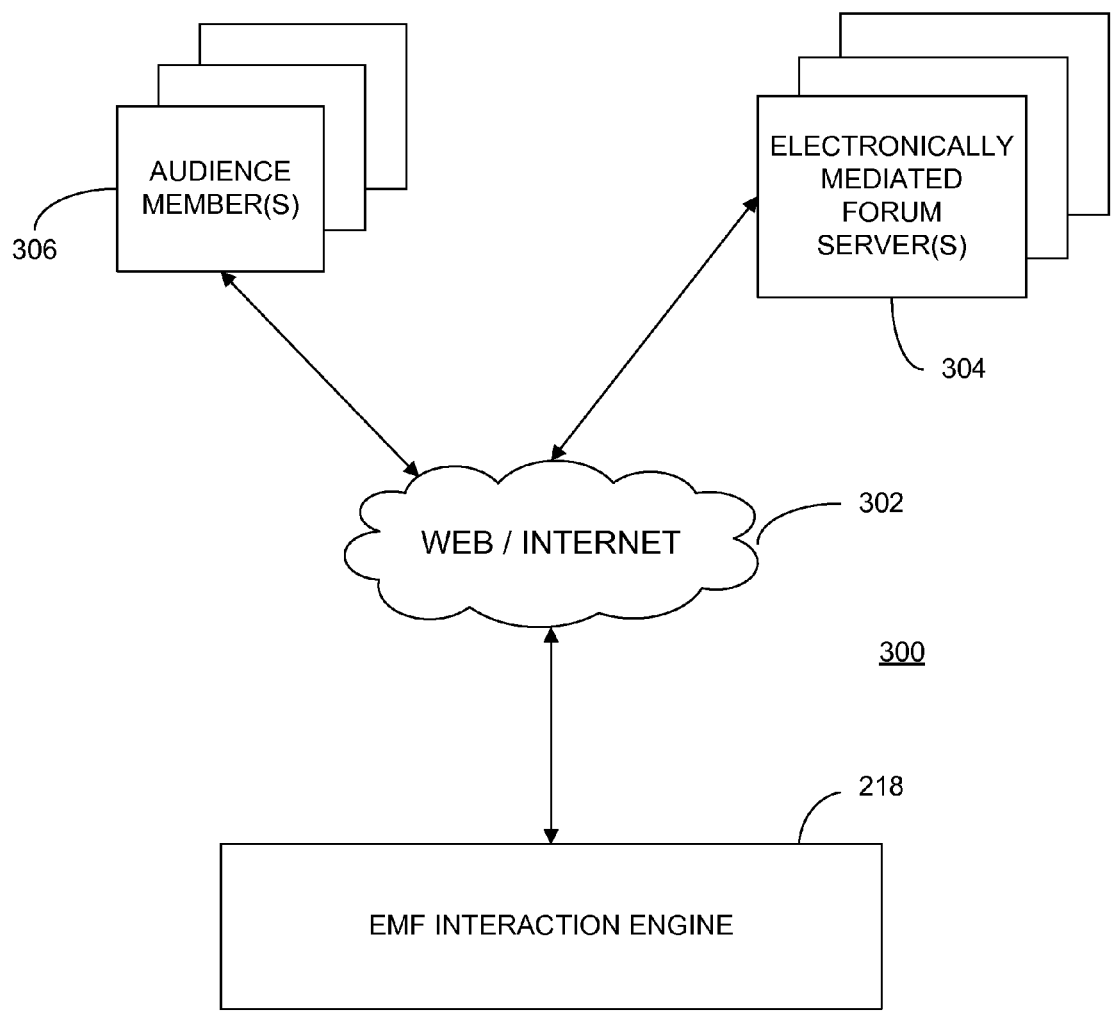
FIG. 3 is a block diagram illustrating another example of a system for determining an effect of characteristics of a message on interaction with the message over an electronically mediated forum in accordance with the instant disclosure.

In accordance with the above, FIG. 3 illustrates a system 300 that may be used to determine the effect of message characteristics 210 on audience interaction with the message (e.g., the first posted message 204, the modified first posted message 206, and/or the second posted message 208) over an electronically mediated forum 202. The electronically mediated forum 202 shown in FIG. 2 may be implemented via one or more electronically mediated forum servers 304 shown in FIG. 3. The servers 304 may make the electronically mediated forum (or forums, where there are a plurality of electronically meditated forums being considered) accessible over any suitable public or private communication network 302 such as the Internet (or, more specifically, the World Wide Web), or proprietary networks such as enterprise local area or wide area networks, respectively. Given such access, a plurality of audience members 306 (i.e., people or entities that interact with messages) may access the forum server(s) 304 via, for example, suitable computer-based devices using techniques known in the art.

Figure 4:
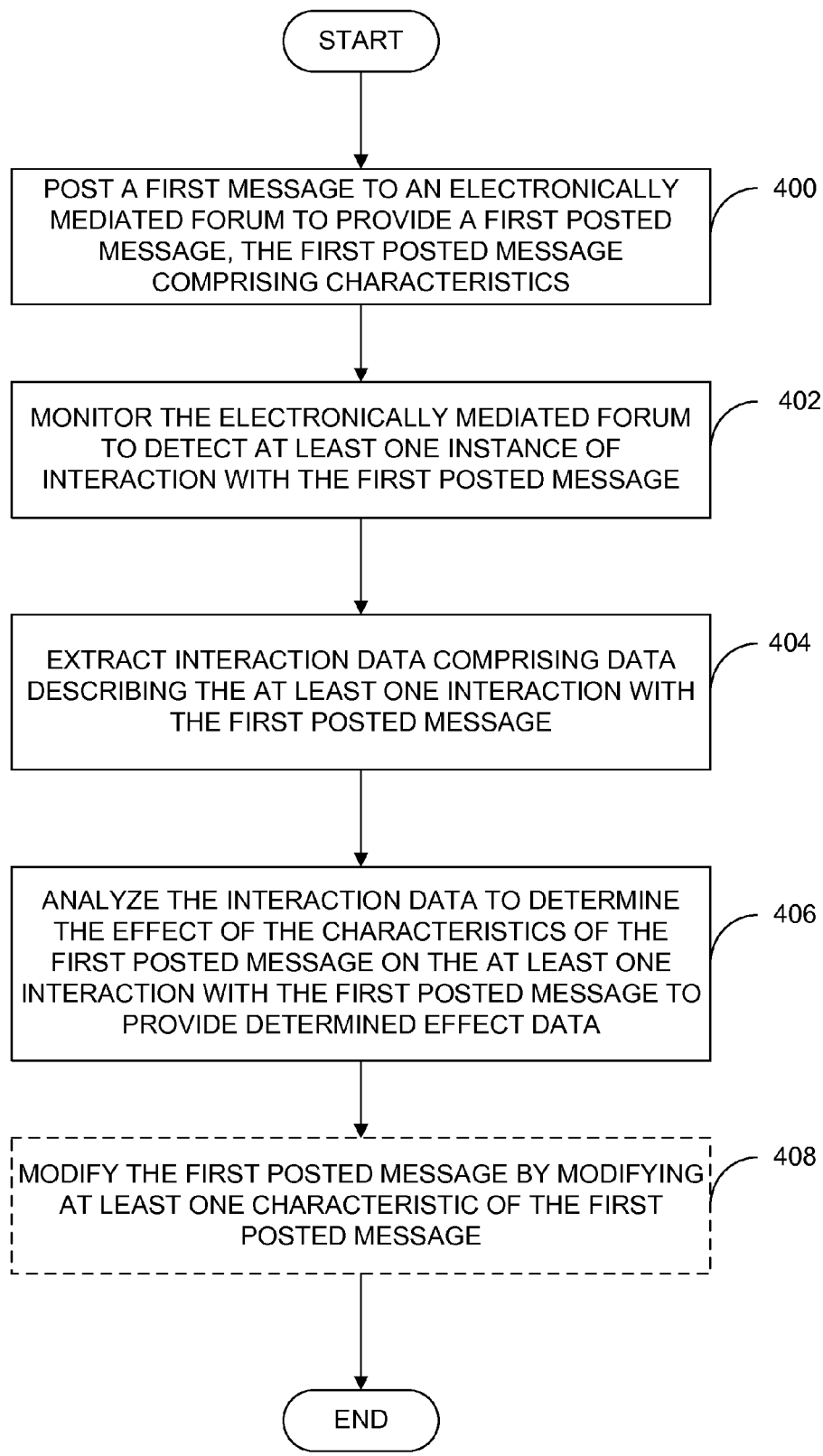
FIG. 4 is a flowchart generally depicting one example of a method for determining an effect of characteristics of a message on interaction with the message over an electronically mediated forum in accordance with the instant disclosure.

Referring now to FIG. 4, a flowchart illustrating a method for determining an effect of characteristics of a first message on interaction with the first message over an electronically mediated forum in accordance with the present disclosure is provided. While the systems 200, 300 are forms for implementing the processing described herein (including that illustrated in FIG. 4), those having ordinary skill in the art will appreciate that other, functionally equivalent techniques may be employed. Furthermore, as known in the art, some or all of the functionalities implemented via executable instructions may also be implemented using firmware and/or hardware devices such as application specific integrated circuits (ASICs), programmable logic arrays, state machines, etc. Once again, those of ordinary skill in the art will appreciate the wide number of variations that may be used is this manner.

Beginning at block 400, a first message is posted to an electronically mediated forum to provide a first posted message. The first posted message includes characteristics. At block 402, the electronically mediated forum is monitored to detect at least one instance of interaction with the first posted message. At block 404, interaction data is extracted from the electronically mediated forum. The interaction data may include data describing at least one interaction with the first posted message over the electronically mediated forum. At block 406, the interaction data is analyzed to determine the effect of the characteristics of the first posted message on the at least one interaction with the first posted message to provide determined effect data. Finally, at optional block 408, the first posted message is modified by modifying at least one characteristic of the first posted message.

Figure 5:
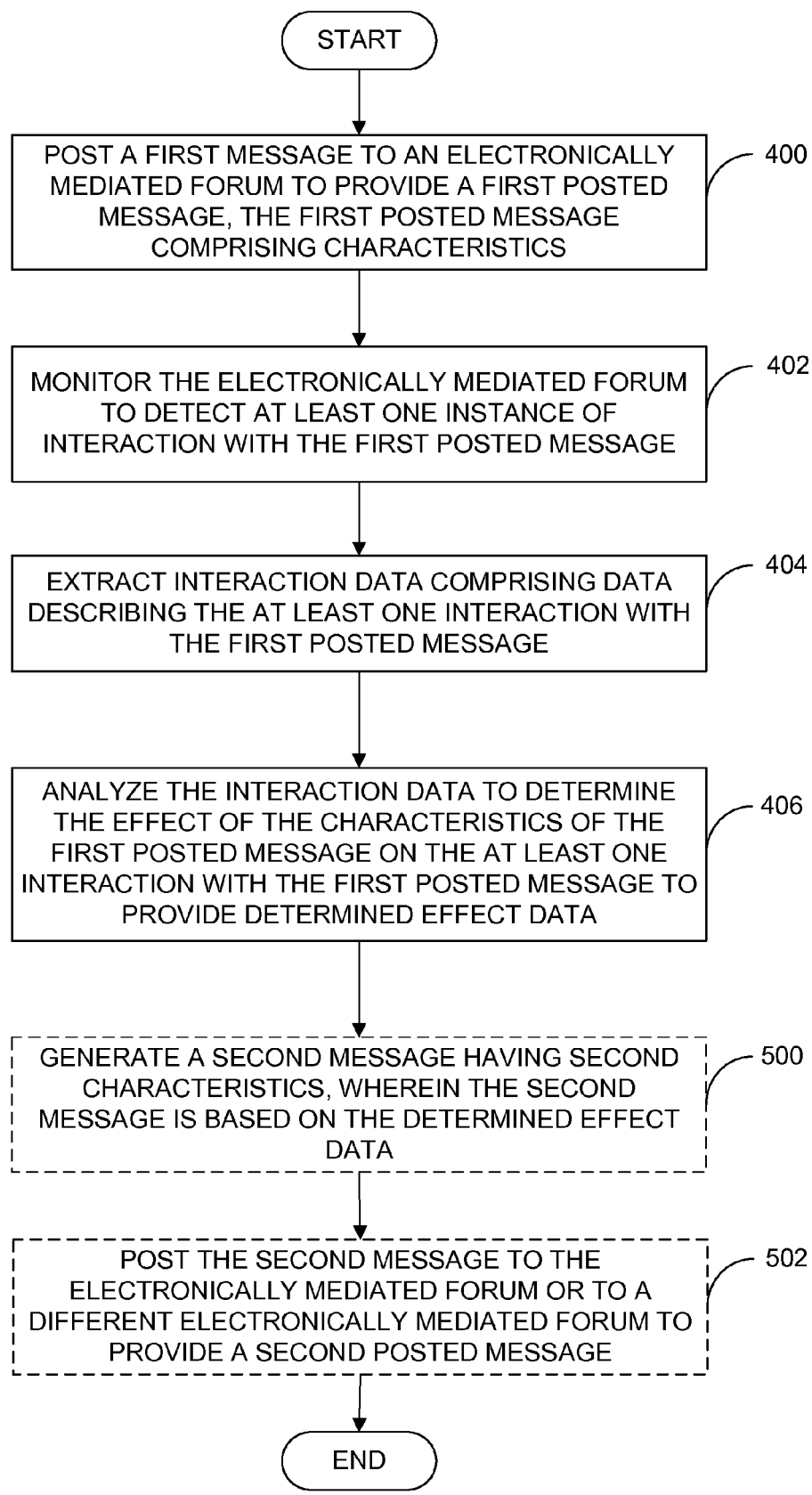
FIG. 5 is a flowchart generally depicting another example of a method for determining an effect of characteristics of a message on interaction with the message over an electronically mediated forum in accordance with the instant disclosure.

FIG. 5 is a flowchart generally depicting another example of a method for determining an effect of characteristics of a first message on interaction with the first message over an electronically mediated forum in accordance with the present disclosure. Processing at blocks 400-406 is carried out in accordance with the discussion provided above with regard to FIG. 4. At optional block 500, a second message is generated having second characteristics, the second message being based on determined effect data resulting from posting of the first message. At optional block 502, the second message is posted to the electronically mediated forum or to a different electronically mediated forum to provide a second posted message. As those having ordinary skill in the art will appreciate, the process of posting messages, assessing their impact according to their respective characteristics, and then modifying/generating new messages for posting may be repeated as many times as desired and/or until the desired goal has been achieved.

While particular embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method comprising:
   transmitting, by a processing device, a first message to a forum,
      the first message including characteristics,
         the characteristics including:
            tactics information that requests feedback from one or more users that interact with the first message,
            attributes information that describes one or more technical features of the first message, and
            themes information that describes one or more particular topics associated with the first message;
   monitoring, by the processing device, the forum to detect at least one interaction with the first message,
      the at least one interaction being detected based on a respective type of interaction associated with each interaction of the at least one interaction, and
      the at least one interaction including a response from at least one of the one or more users to a plurality of:
         the tactics information included in the first message,
         the attributes information included in the first message, or
         the themes information included in the first message, and
      the response including one or more of:
         a click selection of the first message,
         a selection that indicates a level of satisfaction with the first message, or
         sharing information associated with the first message;
   determining, by the processing device and based on monitoring the forum to detect the at least one interaction with the first message, interaction data associated with the first message;
   identifying, by the processing device, goal information that describes desired interaction data for the first message,
      the goal information being analyzed to determine a characteristic, of the characteristics, as a candidate characteristic for alteration, and
      the desired interaction data including a desired response to a plurality of:
         the tactics information,
         the attributes information included in the first message, or
         the themes information included in the first message;
   comparing, by the processing device, the determined interaction data and the goal information;
   determining, by the processing device and based on the comparison, that the determined interaction data does not satisfy the goal information; and
   transmitting, by the processing device and based on determining that the determined interaction data does not satisfy the goal information, a second message to the forum,
      the second message being different than the first message, and
      the second message including at least one new characteristic,
         the at least one new characteristic including the alteration to the candidate characteristic, and
         the at least one new characteristic being based on:
            the comparison, and
            historical data regarding user interaction associated with the at least one new characteristic in one or more other messages,
               the one or more other messages being different than the first message and being different than the second message.

2. The method of claim 1, where the second message is a modified first message,
   the modified first message including a modification to at least one characteristic of the characteristics of the first message.

3. The method of claim 1, further comprising:
   generating the second message; and
   transmitting the second message to another forum,
      the other forum being different than the forum.

4. The method of claim 1, where the attribute information includes at least one of:
   time attributes indicating when the first message was posted to the forum,
   type attributes indicating a type of media that is associated with the first message, or
   forum attributes indicating the forum associated with the first message.

5. The method of claim 1, where the tactics information includes at least one of:
   information indicating whether the first message is a question;
   information indicating whether the first message was posted to the forum prior to a release of a product associated with the first message or a service associated with the first message;
   information indicating whether the first message requests an opinion, or
   information indicating whether the first message requests a response.

6. The method of claim 1, where the theme information includes information describing a category associated with the first message.

7. A device comprising:
   a memory to store instructions; and
   a processor to execute the instructions to:
      transmit a first message to a forum,
         the first message including characteristics,
            the characteristics including:
               tactics information that requests feedback from one or more users that interact with the first message,
               attributes information that describes one or more technical features of the first message, and
               themes information that describes one or more particular topics associated with the first message;
      monitor the forum to detect at least one interaction with the first message,
         the at least one interaction being detected based on a respective type of interaction associated with each interaction of the at least one interaction, and
         the at least one interaction including a response from at least one of the one or more users to a plurality of:
            the tactics information included in the first message,
            the attributes information included in the first message, or
            the themes information included in the first message, and
         the response including one or more of:
            a click selection of the first message, a selection that indicates a level of satisfaction with the first message, or sharing information associated with the first message;

determine, based on monitoring the forum to detect the at least one interaction with the first message, interaction data associated with the first message;

identify goal information that describes desired interaction data for the first message, the goal information being analyzed to determine a characteristic, of the characteristics, as a candidate characteristic for alteration, and the desired interaction data including a desired response to a plurality of:

the tactics information, the attributes information included in the first message, or the themes information included in the first message;

compare the determined interaction data and the goal information;

determine, based on the comparison, that the determined interaction data does not satisfy the goal information; and transmit, based on determining that the determined interaction data does not satisfy the goal information, a second message to the forum, the second message being different than the first message, and the second message including at least one new characteristic, the at least one new characteristic including the alteration to the candidate characteristic, and the at least one new characteristic being based on:

the comparison, and historical data regarding user interaction associated with the at least one new characteristic in one or more other messages, the one or more other messages being different than the first message and being different than the second message.

8. The device of claim 7, where the second message is a modified first message, the modified first message including a modification to at least one characteristic of the characteristics of the first message.

9. The device of claim 7, where the processor is further to:
generate the second message; and
transmit the second message to another forum,
the other forum being different than the forum.

10. The device of claim 7, where the attribute information includes at least one of:

time attributes indicating when the first message was posted to the forum, type attributes indicating a type of media that is associated with the first message, or forum attributes indicating the forum associated with the first message.

11. The device of claim 7, where the tactics information includes at least one of:

information indicating whether the first message is a question;

information indicating whether the first message was posted to the forum prior to a release of a product associated with the first message or a service associated with the first message;

information indicating whether the first message requests an opinion, or information indicating whether the first message requests a response.

12. The device of claim 7, where the theme information includes information describing a category associated with the first message.

13. A non-transitory computer-readable storage medium storing instructions, the instructions comprising:

one or more instructions which, when executed by a processor, cause the processor to:

transmit a first message to a forum, the first message including characteristics, the characteristics including:

tactics information that requests feedback from one or more users that interact with the first message, attributes information that describes one or more technical features of the first message, and themes information that describes one or more particular topics associated with the first message;

monitor the forum to detect at least one interaction with the first message, the at least one interaction being detected based on a respective type of interaction associated with each interaction of the at least one interaction, and the at least one interaction including a response from at least one of the one or more users to a plurality of:

the tactics information included in the first message, the attributes information included in the first message, or the themes information included in the first message, and the response including one or more of:

a click selection of the first message, a selection that indicates a level of satisfaction with the first message, or sharing information associated with the first message;

determine, based on monitoring the forum to detect the at least one interaction with the first message, interaction data associated with the first message;

compare the determined interaction data and goal information that describes desired interaction data for the first message, the goal information being analyzed to determine a characteristic, of the characteristics, as a candidate characteristic for alteration, and the desired interaction data including a desired response to a plurality of:

the tactics information, the attributes information included in the first message, or the themes information included in the first message;

determine, based on the comparison, that the determined interaction data does not satisfy the goal information; and transmit, based on determining that the determined interaction data does not satisfy the goal information, a second message to the forum, the second message being different than the first message, and the second message including at least one new characteristic, the at least one new characteristic including the alteration to the candidate characteristic, and the at least one new characteristic being based on:

the comparison, and historical data regarding user interaction associated with the at least one new characteristic in one or more other messages, the one or more other messages being different than the first message and being different than the second message.

14. The non-transitory computer-readable storage medium of claim 13, where the second message is a modified first message, the modified first message including a modification to at least one characteristic of the characteristics of the first message.

15. The non-transitory computer-readable storage medium of claim 13, where the instructions further include:

one or more instructions to generate the second message; and one or more instructions to transmit the second message to another forum, the other forum being different than the forum.

16. The non-transitory computer-readable storage medium of claim 13, where the attribute information includes at least one of:

time attributes indicating when the first message was posted to the forum, type attributes indicating a type of media that is associated with the first message, or forum attributes indicating the forum associated with the first message.

17. The non-transitory computer-readable storage medium of claim 13, where the tactics information includes at least one of:

information indicating whether the first message is a question;

information indicating whether the first message was posted to the forum prior to a release of a product associated with the first message or a service associated with the first message;

information indicating whether the first message requests an opinion, or information indicating whether the first message requests a response.

18. The non-transitory computer-readable storage medium of claim 13, where the theme information includes information describing a category associated with the first message.

19. The method of claim 1, where the theme information is determined based on content included in the first message.

20. The device of claim 7, where the theme information is determined based on content included in the first message.

\* \* \* \* \*